Nov. 21, 1961   M. L. SCHOCK   3,009,250
SPIRIT LEVEL AND GRADE INDICATOR
Filed Oct. 22, 1958   3 Sheets-Sheet 1
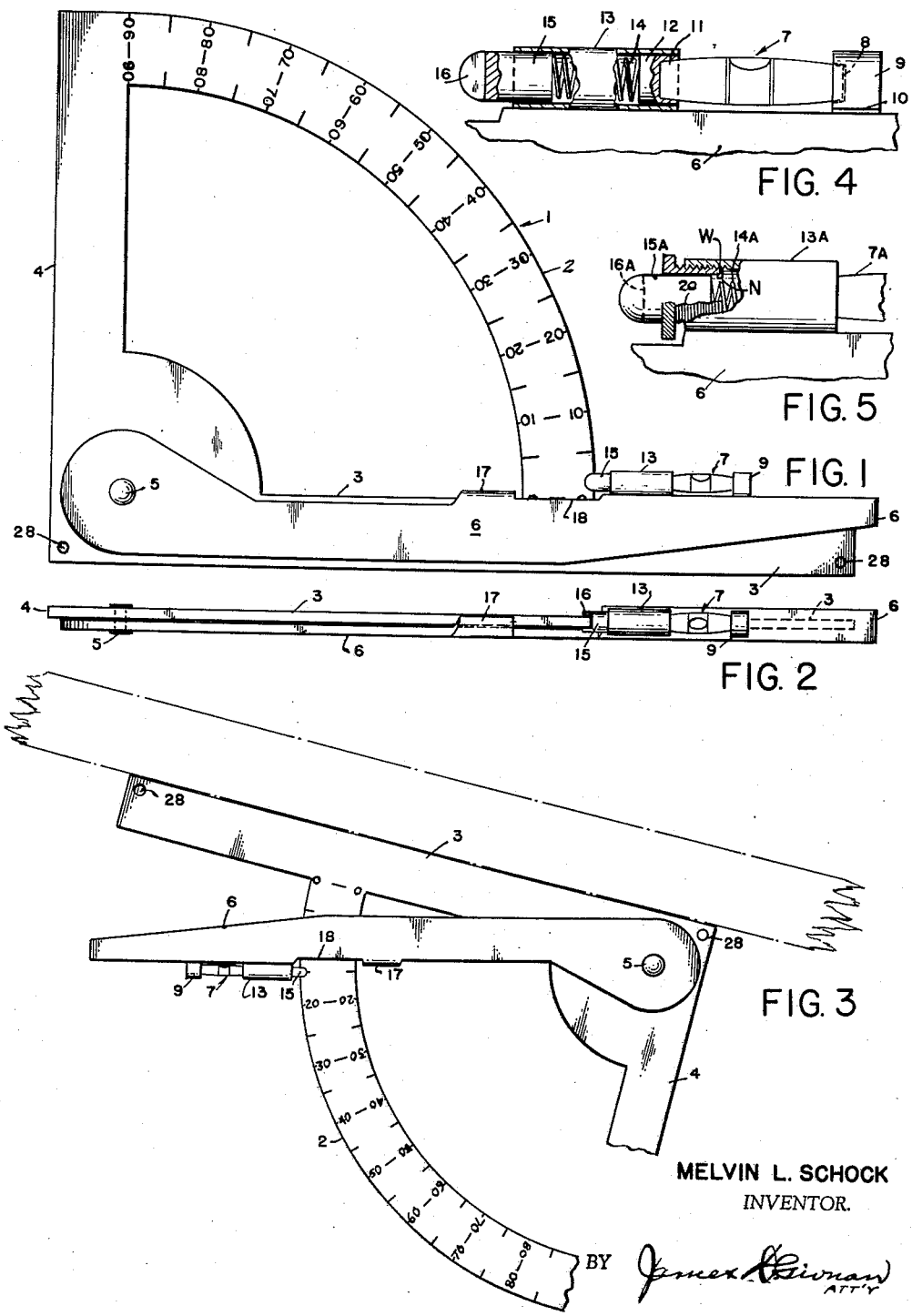
MELVIN L. SCHOCK
INVENTOR.
BY *James Coinman*
ATT'Y Nov. 21, 1961  M. L. SCHOCK  3,009,250
SPIRIT LEVEL AND GRADE INDICATOR
Filed Oct. 22, 1958  3 Sheets-Sheet 2

MELVIN L. SCHOCK
INVENTOR.

BY *James ...*
ATT'Y

Nov. 21, 1961  M. L. SCHOCK  3,009,250
SPIRIT LEVEL AND GRADE INDICATOR
Filed Oct. 22, 1958  3 Sheets-Sheet 3

MELVIN L. SCHOCK
INVENTOR.

BY *James A. Givnan*
ATTY

United States Patent Office 3,009,250
Patented Nov. 21, 1961

---

3,009,250
SPIRIT LEVEL AND GRADE INDICATOR
Melvin L. Schock, P.O. Box 635, Hood River, Oreg.
Filed Oct. 22, 1958, Ser. No. 768,962
1 Claim. (Cl. 33—89)

This invention relates to improvements in spirit levels and grade indicators, particularly adapted for the measurement of angles, levels and verticals.

The invention has for its principal object the simplification of an instrument of the character described and the making of it more convenient, rapid and accurate in use, increasing the range of application of the instrument to various kinds of work, or structures to be measured, including structures to which it is sometimes difficult to apply this class of instrument conveniently or with accurate results.

Another object of the invention is a provision of frictional means carried by an actuating arm for automatically holding or manually locking the arm in any set position relative to the graduations on the quadrant.

A further object is the provision of means removably secured to the instrument for holding its base in parallel alignment with the top surface of pipes of various diameters.

The foregoing and other objects and advantages which will become subsequently apparent reside in the details of construction and operation as more fully hereinafter described and claimed, reference being had to the accompanying drawing forming a part hereof and in which:

FIGURE 1 is a side elevational view of a spirit level and grade indicator made in accordance with my invention.

FIGURE 2 is a top plan view of FIGURE 1.

FIGURE 3 is a view similar to FIGURE 1 on a reduced scale with a fragment broken away and shown in an inverted position for application to the underside of an incline surface.

FIGURE 4 is a fragmentary sectional side view on an enlarged scale of the spirit level and mounting means therefor as shown in FIGURE 1.

FIGURE 5 is a view similar to FIGURE 4 illustrating a modified form of spirit level mounting means and quadrant engaging means.

Figure 6:
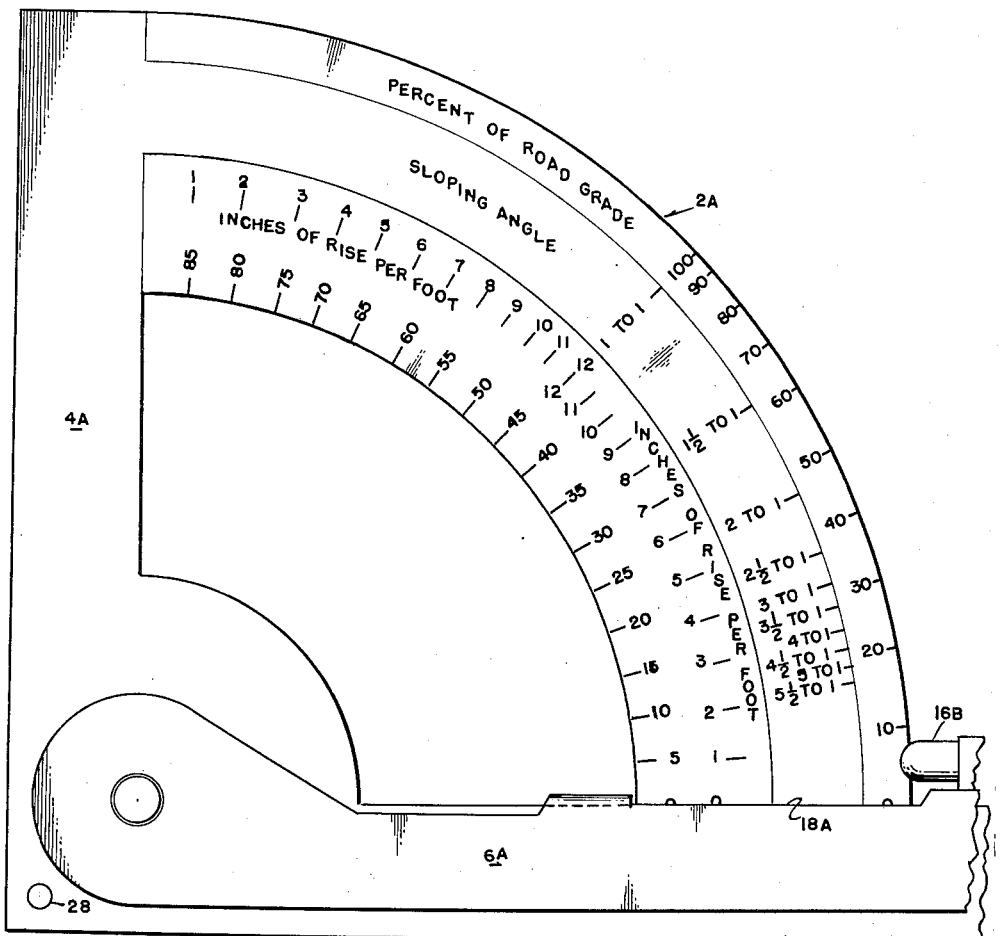
FIGURE 6 is a modified form of the quadrant shown in FIGURE 1.
Figure 8:
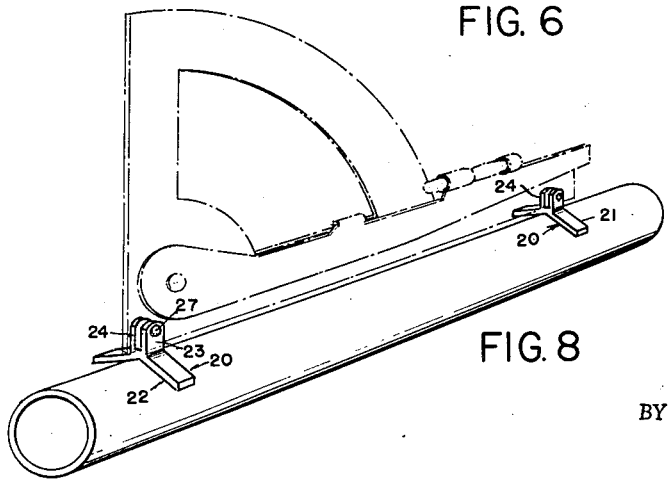
FIGURE 8 is a perspective view of the brackets removably secured to either form of the invention for self-aligning the same with a pipe of any diameter.

With continuing reference to the drawing and particularly FIGURES 1 to 3 thereof, reference numeral 1 indicates, generally, the main body of the invention which comprises a quadrant 2 integrated with a horizontal base 3 and a vertical side 4. The quadrant is marked with two scales of degrees from 0 to 90° with one readable from the base upwardly to the side 4 when the instrument is used in the position shown in FIGURE 1. The other scale is conveniently readable from the base 3 to the side 4 when the instrument is used in an inverted position as shown in FIGURE 3.

Swingably attached to the base by means of a rivet, or the like, as indicated at 5 is an actuating arm 6 provided at its outer end with a spirit level 7 (FIGURE 4) whose one end is engaged within a recess 8 in a housing 9 secured in any approved manner as at 10 to the arm. The opposite end of the spirit level is engaged within a recess 11 in one end of a cylindrical element 12 disposed within a cylinder 13 also secured in any approved manner to the top edge of the arm 6. The inner end of the element 12 abuts a compression spring 14 whose opposite end bears against the inner end of a frictional element 15 also disposed within the cylinder 13 and whose outer end is bifurcated as at 16 to slidably embrace the outer edge of the quadrant as best shown in FIGURE 2.

Between the pivot 5 and the inner edge of the quadrant the top edge of the arm is provided with a projection 17 extending upwardly and over the top edge of base 3 to provide a limit stop for automatically aligning a straight edge 18 of the arm 6 with the graduations on the quadrant as the arm is swung upwardly or downwardly relative thereto. By this arrangement the frictional element 15 will hold the arm and straight edge 18 in any position relative to the graduations on the quadrant.

The modified form of frictional means as shown in FIGURE 5 comprises a cylinder 13A secured to the top edge of the arm 6. One end of the spirit level 7A is attached to the interior of one end of the cylinder in the same manner as in FIGURE 4, and the outer end of the compression spring 14A within the cylinder extends through an opening N in the bottom or inner wall W of a hollow nut 20 threaded within the corresponding end of the cylinder as shown. This end of the spring bears against the inner end of a frictional element 15A slidably mounted within the nut 20, bifurcated at its outer end as at 16A to embrace the outer edge of the quadrant. The spring normally maintains the frictional element 15A in frictional engagement with the outer edge of the quadrant for normal operation as aforesaid, but when it is desired to lock the straight edge 18 of the arm in any set position relative to the graduations on the quadrant it is merely necessary to advance the nut 20 on its threads relative to the cylinder 13A and the amount of such advancement will determine the degree of frictional engagement of the frictional element with the quadrant as said element is engaged by the bottom or inner wall W of the nut and forced outwardly against the quadrant.

In operating the invention to determine the degree of angulation, or incline, of a surface upon which the edge of the base 3 is resting it is merely necessary to swing the arm 6 upwardly until the bubble of the spirit level 7 arrives at the center of the level which will indicate that the arm is in a horizontal position relative to the incline and the degree of inclination will be indicated by the location of the straight edge 18 on the quadrant.

To determine the incline of overhead surfaces such as rafters, or the like, as indicated in broken lines in FIGURE 3, it is merely necessary to invert the instrument as shown with the base 3 in contact with the overhead surface. Then upon swinging the arm 6 downwardly to a horizontal position, which will be indicated by the spirit level, as shown, the degree of inclination will be indicated on the quadrant by the straightedge 18.

In the modified form of quadrant as shown in FIGURE 6 I provide, in addition to the graduations of a circle reading from 0 to 90 degrees, other graduations reading from 0 to 12 from the base 3A to the center of the quadrant to indicate inches of rise per foot from the horizontal and reading from 12 to 0 from the center of the quadrant to the side 4A thereof to indicate inches of rise per foot.

Adjacent these graduations are others indicating the slope of an angle from 1 foot to 1 foot from the center of the quadrant, or at 45 degrees, to 5½ feet to 1 foot toward the bottom of the quadrant.

The outer marginal edge of the quadrant is marked with percentages reading from 0 at the base to 100 at the center of the quadrant, or at a 45 degree angle, to indicate percent of road grade. The scales in both forms of quadrant are graduated for single degrees, but may be more finely or less finely graduated, and it will be readily understood that scales and graduations other than those shown may be applied to the quadrant.

Figure 7:
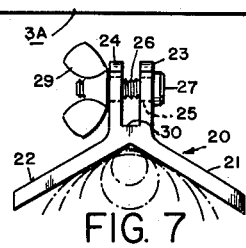
FIGURE 7 is an end view of one of two identical brackets adapted to support either quadrant frame upon and in alignment with pipes of various diameters.

For conveniently and accurately positioning the base 3, 3A, or 3B of the various forms of the invention upon a pipe, or pipes of various diameters as indicated by broken lines in FIGURE 7, in precise alignment therewith, I provide a pair of identical supporting brackets indicated generally at 20. Each bracket comprises a pair of downwardly diverging arms 21 and 22 integrated with spaced apart vertical lugs 23 and 24 having aligned transverse openings 25 therethrough to receive a bolt 26 whose head 27 bears against one lug 23. The bolts are adapted to pass through enlarged openings 28 in each base of the right angular frame. A wing nut 29 is provided to securely clamp either base between the lugs. The openings 28, being of larger diameter than that of the bolts 26, will allow the bottom edge of either quadrant base to rest squarely upon the flat bottom of surface 30 between the lugs. The quadrant base will thus lie parallel at all times with a pipe or pipes upon which it is placed and supported by the brackets.

Figure 9:
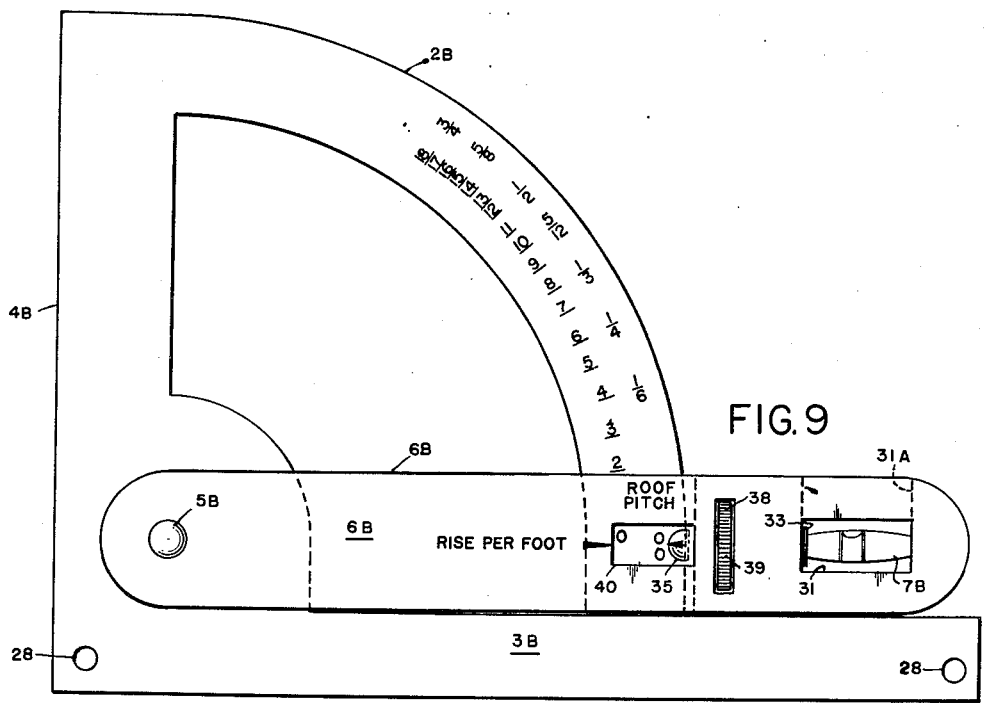
FIGURE 9 is a side elevational view of a further modification of spirit level and quadrant adapted for determining rafter angles.

In the modified form of the invention as shown in FIGURE 9, the quadrant 2B is provided on one side with a scale of inches of rise per foot and a scale of roof pitches, and the opposite side is provided with a scale of degrees from 0 through 90° as shown in FIGURE 2. The base 3B is of greater length than the side 4B and extends beyond the quadrant, as shown, to provide a limit stop for the actuating arm 6B.

Figure 10:
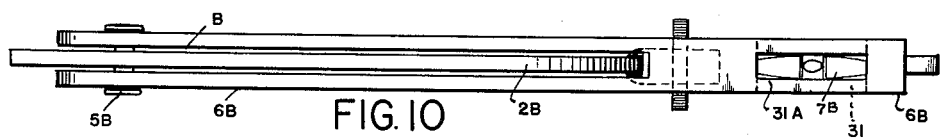
FIGURE 10 is a top plan view of FIGURE 9.
Figure 11:
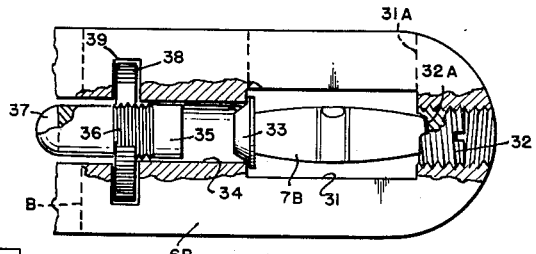
FIGURE 11 is a fragmentary side view on an enlarged scale and partly in section of the actuating arm, the quadrant engaging means and the mounting means for the spirit level as shown in FIGURE 9.
Figure 12:
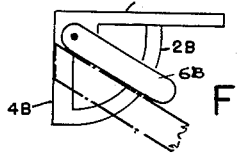
FIGURES 12, 13 and 14 are diagrammatic views on a reduced scale of the device in FIGURE 9 as used in determining respectively the ridge cut angle of a rafter, the plumb cut angle of a rafter, and the heel cut angle of a rafter.
Figures 13, 14:
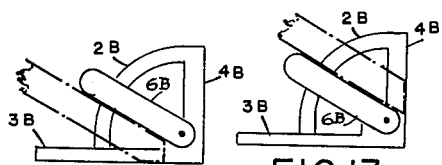

The actuating arm 6B is substantially coextensive in length with said base and of greater thickness than the quadrant and its base 3B as best shown in FIGURE 10. The arm is bifurcated as at B for the major portion of its length to slidably straddle the quadrant when swung about the pivot 5B by means of which the arm is pivotally attached near the apex of the base 3B and the vertical side 4B.

A spirit level 7B is mounted within a transverse and vertical opening 31 and 31A near the free end of the actuating arm by means of a threaded plug 32 recessed as at 32A to engage and center the adjacent end of the spirit level and to urge the opposite end of the level into centering engagement with a cup 33 mounted within one end of a bore 34 whose opposite end opens into the bifurcation B. Disposed within the bore 34 and normally extending outwardly into the bifurcation is a frictional element 35 externally threaded as at 36 and bifurcated as at 37 at its outer end to slidably embrace the outer edge of the quadrant. For locking the frictional element in engagement with the quadrant and thereby setting the actuating arm 6B in any desired relation to the quadrant, I provide a nut 38 threadedly engaged with the threads 36 and operable within a transverse recess 39 in the actuating arm. A sight opening 40 extends through the legs of the bifurcation in the actuating arm 6B for convenient viewing of the scales on either side of the quadrant in relation to the pointer on the frictional element 35 and at one edge of the sight opening.

While I have shown particular forms of embodiment of my invention I am aware that many minor changes therein will readily suggest themselves to others skilled in the art without departing from the spirit and scope of the invention. Having thus described my invention what I claim as new and desire to protect by Letters Patent is:

A spirit level and grade indicator comprising a right angular frame having one side and a base, a quadrant integrated at one of its ends with the top end of one said side, said base being of greater length than said one side of the frame and extending beyond the point of integration of the quadrant with said base, an actuating arm, substantially equal in length to said base, means pivotally attaching one end of said arm to said frame at its inner end near the apex of said one side and base of the right angular frame, a projection on said arm which is adapted to contact said base to provide a limit stop for the actuating arm, said arm having a pair of spaced apart cylindrical housing mounted thereupon between the quadrant and the outer end of the arm, a spirit level mounted within said housings and exposed therebetween, a hollow nut threadedly engaged within one end of one of said housings and extending outwardly therefrom, said nut having an end wall on its inner end, said wall having an opening therein, a detent slidably mounted within said nut and adapted for engagement with the quadrant, a compression spring mounted within said one of said housings extending through said opening into contact with said detent to thereby normally maintain the detent in frictional engagement with the quadrant, and whereby advancement of the nut on its threads and engagement of the inner wall of the nut with said detent will force the detent into locked engagement with the quadrant.

References Cited in the file of this patent

UNITED STATES PATENTS

| | | |
|---|---|---|
| 450,457 | Green | Apr. 14, 1891 |
| 527,815 | Schnell | Oct. 23, 1894 |
| 842,999 | Calhoon | Feb. 5, 1907 |
| 868,700 | Roberts | Oct. 22, 1907 |
| 894,832 | Horton | Aug. 4, 1908 |
| 1,191,008 | Laakkonen | July 11, 1916 |
| 1,450,296 | Lucas | Apr. 3, 1923 |
| 2,551,187 | Veyret et al. | May 1, 1951 |